US 9,350,725 B2

(12) United States Patent
Sposato et al.

(10) Patent No.: US 9,350,725 B2
(45) Date of Patent: *May 24, 2016

(54) ENABLING ACCESS TO A SECURED WIRELESS LOCAL NETWORK WITHOUT USER INPUT OF A NETWORK PASSWORD

(71) Applicant: AT&T Intellectual Property I, L.P., Atlanta, GA (US)

(72) Inventors: Stephen Sposato, Lafayette, CA (US); Kevin Meng, San Ramon, CA (US); Cheng-Hong Hu, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/310,252

(22) Filed: Jun. 20, 2014

(65) Prior Publication Data

US 2014/0304788 A1    Oct. 9, 2014

Related U.S. Application Data

(63) Continuation of application No. 13/282,597, filed on Oct. 27, 2011, now Pat. No. 8,813,194.

(51) Int. Cl.
*H04L 29/06* (2006.01)
*G06F 21/45* (2013.01)
*H04W 12/06* (2009.01)

(52) U.S. Cl.
CPC ............. *H04L 63/083* (2013.01); *G06F 21/45* (2013.01); *H04L 63/20* (2013.01); *H04W 12/06* (2013.01)

(58) Field of Classification Search
CPC ..... H04L 63/083; H04L 63/20; H04W 12/06; G06F 21/45
See application file for complete search history.

(56) References Cited

U.S. PATENT DOCUMENTS

| 7,185,360 | B1 | 2/2007 | Anton, Jr. et al. | |
|---|---|---|---|---|
| 7,761,710 | B2 * | 7/2010 | Lillie | H04L 63/068 380/247 |
| 8,264,322 | B2 * | 9/2012 | Rodenbeck | G07C 9/00103 340/5.64 |
| 2004/0003285 | A1 * | 1/2004 | Whelan et al. | 713/201 |
| 2005/0198534 | A1 | 9/2005 | Matta et al. | |
| 2005/0245233 | A1 * | 11/2005 | Anderson | 455/411 |
| 2005/0254652 | A1 | 11/2005 | Engler et al. | |
| 2005/0265552 | A1 * | 12/2005 | Olson | H04L 63/0492 380/270 |

(Continued)

OTHER PUBLICATIONS

Lindqvist et al., Privacy-Preserving 802.11 Access-Point Discovery, Mar. 2009, Proceedings of the second ACM conference on Wireless network security, WiSec '09, pp. 123-130.*

(Continued)

*Primary Examiner* — Kenneth Chang
(74) *Attorney, Agent, or Firm* — Toler Law Group, PC

(57) ABSTRACT

A method includes identifying, at a security device of a secured wireless network, a wireless-enabled device that is not authorized to access the secured wireless network. The method also includes sending an access request message directed to a messaging address in response to identifying the wireless-enabled device. The access request message includes information that identifies the wireless-enabled device includes a first selectable option to allow access to the secured wireless network without requiring user input of a network password associated with the secured wireless network via the wireless-enabled device. The access request message also and includes a second selectable option to deny access to the secured wireless network.

20 Claims, 7 Drawing Sheets

(56) References Cited

U.S. PATENT DOCUMENTS

| | | |
|---|---|---|
| 2006/0053276 A1 | 3/2006 | Lortz et al. |
| 2006/0233375 A1 | 10/2006 | Lillie et al. |
| 2006/0236376 A1 | 10/2006 | Liu et al. |
| 2006/0251256 A1 | 11/2006 | Asokan et al. |
| 2006/0281457 A1 | 12/2006 | Huotari et al. |
| 2007/0121854 A1* | 5/2007 | Soo et al. ............... 379/142.01 |
| 2008/0189420 A1 | 8/2008 | Herrod et al. |
| 2008/0281952 A1 | 11/2008 | Fedotenko |
| 2009/0005005 A1* | 1/2009 | Forstall et al. ............... 455/411 |
| 2009/0122787 A1 | 5/2009 | Huotari et al. |
| 2009/0245176 A1* | 10/2009 | Balasubramanian et al. 370/328 |
| 2009/0288152 A1 | 11/2009 | Huber et al. |
| 2010/0042690 A1* | 2/2010 | Wall ............................. 709/206 |
| 2010/0087164 A1 | 4/2010 | Ritzau et al. |
| 2010/0216434 A1 | 8/2010 | Marcellino et al. |

OTHER PUBLICATIONS

"Guest Networking/Simplified Wi-Fi Guest Access Management", Ruckus Wireless (www.ruckuswireless.com), copyright 2008, 3 pages.

"Juniper Networks SmartPass," Juniper Networks Data Sheet, Mar. 2011, Juniper Networks, Inc., Sunnyvale, CA, 4 pages.

Ji, et al., "Self-organizing Security Scheme for Multi-hop Wireless Access Networks", Mar. 2004, 2004 IEEE Proceedings of the Aerospace Conference, vol. 2, pp. 1231-1240.

* cited by examiner

US 9,350,725 B2

ENABLING ACCESS TO A SECURED WIRELESS LOCAL NETWORK WITHOUT USER INPUT OF A NETWORK PASSWORD

PRIORITY CLAIM

This application claims priority from, and is a continuation of, U.S. patent application Ser. No. 13/282,597, filed on Oct. 27, 2011, which is incorporated herein by reference in its entirety.

FIELD OF THE DISCLOSURE

The present disclosure is generally related to enabling access to a secured wireless local network without user input of a network password.

BACKGROUND

An administrator (e.g., an owner or operator) of a wireless local network may make the wireless local network a secured wireless local network by setting a network password. To gain access to the secured wireless local network, user input of the network password into a device attempting to access the secured wireless local network may be required. The user input of the network password may be accomplished by correctly typing the network password into the device or by coupling a memory device (e.g., a USB drive) that has a stored copy of the network password to the device. Requiring entry of the network password to access the secured wireless local network may inhibit unwanted bandwidth use, may inhibit unauthorized access to the local network and the internet, and may limit security risks to equipment coupled to the wireless local network. The network password may be infrequently used by the administrator. Remembering the network password, a location of a written copy of the network password, or a location of a memory device that contains the network password may be difficult. In addition, the administrator of the secured wireless local network may not be present or available to provide the network password to a device that requests access to the secured wireless local network.

DETAILED DESCRIPTION

Figure 1:
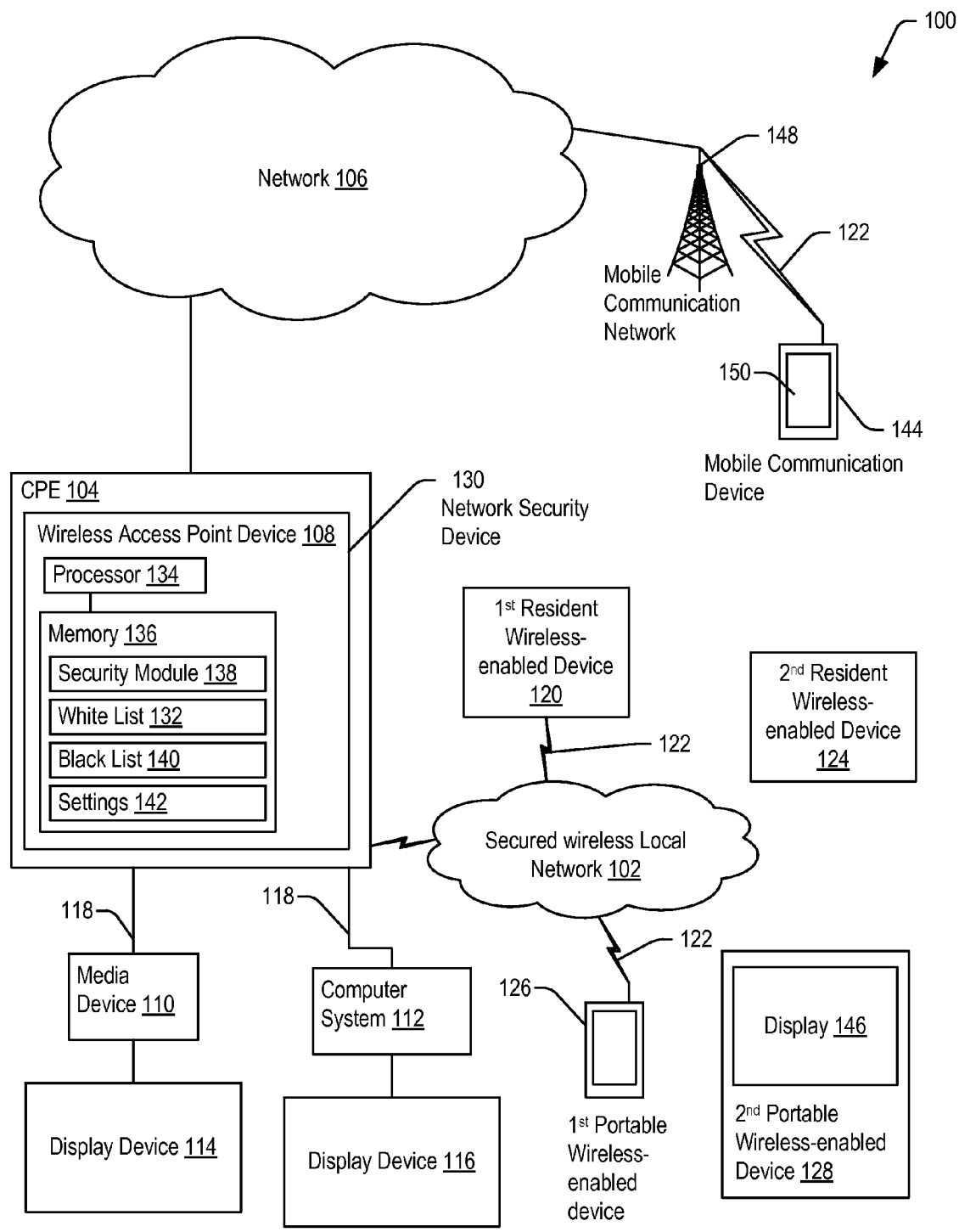
FIG. 1 is a block diagram of an embodiment of a system to enable access to a secured wireless local network without user input of a network password.

Simplified access to a secured wireless local network without entry of a network password may be provided for a wireless-enabled device. In response to a request to access the secured wireless local network, a request for identification information may be sent to the wireless-enabled device. At least a portion of identification information provided by the wireless-enabled device may be used to generate an access request message. The access request message may be sent to at least one messaging address associated with one or more administrators of the secured wireless local network. The access request message may enable a recipient of the access request message to grant the wireless-enabled device access to the secured wireless local network without entry of the network password, grant the wireless-enabled device constrained access to the secured wireless local network without entry of the password, or deny the wireless-enabled device access to the secured wireless local network.

In a particular embodiment, a method includes receiving a request to access a secured wireless local network at a security device of the secured wireless local network from a wireless-enabled device that is not authorized to access the secured wireless local network when the request is received. The method includes receiving identification information from the wireless-enabled device at the security device. The method also includes automatically sending an access request message from the security device to at least one messaging address. The access request message provides a recipient of the access request message with at least a portion of the identification information and a selectable option to allow the wireless-enabled device access to the secured wireless local network without requiring user input of a network password associated with the secured wireless local network via the wireless-enabled device.

In a particular embodiment, a computer readable medium includes instructions. The instructions are executable by a processor to receive a request to access a secured wireless local network from a wireless-enabled device. The wireless-enabled device is not authorized to access the secured wireless local network when the request is received. The instructions are executable by the processor to receive identification information from the wireless-enabled device. The instructions are also executable by the processor to automatically send an access request message. The access request message provides a recipient of the access request message with at least a portion of the identification information, a first selectable option to allow the wireless-enabled device access to the secured wireless local network without requiring user input of a password associated with the secured wireless local network, and a second selectable option to deny the wireless-enabled device access to the secured wireless network.

In a particular embodiment, a system includes a processor and a memory accessible to the processor. The memory includes instructions executable by the processor to automatically send an access request message to at least one messaging address. The access request message provides a recipient of the access request message a selectable option to allow a wireless-enabled device access to the secured wireless local network without requiring user input of a network password associated with the secured wireless local network via the wireless-enabled device. The access request message is sent in response to receipt of identification information from the wireless-enabled device when the processor is in a first mode. The access request message is sent in response to detection of the wireless-enabled device when the processor is in a second mode.

FIG. 1 is a block diagram of a particular embodiment of a system 100 to enable access to a secured wireless local network 102 without user input of a network password. The system 100 may include customer premises equipment (CPE) 104 that facilitates communications to and from a network 106 and the secured wireless local network 102. The network 106 may include one or more private networks to provide subscription content (e.g., a cable television network, an internet protocol television network, a satellite television network, etc.), one or more other private networks, the internet, or combinations thereof. The secured wireless local network 102 may be established by the CPE 104. The CPE 104 may include a router, a wireless access point device 108, a local area network device, a modem (e.g., a digital subscriber line (DSL) modem or a cable modem), a residential gateway, another communication device, or combinations thereof. The secured wireless local network 102 may be, for example, an Institute of Electrical and Electronics Engineers (IEEE) 802.11 network (i.e., a Wi-Fi network), an IEEE 802.16 network (i.e., a WMAX network), or an IEEE 802.15 network (i.e., a personal area network). The secured wireless local network 102 may be located at or near a residence, a business (e.g., a hotel, a motel, an internet cafe, an office, etc.), another type of enterprise, or combinations thereof.

The system 100 may include a media device 110, a computer system 112, or both. The media device 110 and the computer system 112 may be coupled to the CPE 104. The media device 110 may be a set-top box device or another device able to send subscription media content (e.g., television programming and pay-per-view programming) received from a service provider via the network 106 and other content received via the network 106 to a display device 114. The computer system 112 may be a desktop computer or other type of computer that is able to send content received from the network 106 to a display device 116. The media device 110 and the computer system 112 may be coupled by connections 118 to the CPE 104. The connections 118 may be wireless connections or physical connections (e.g., fiber optic cables, Ethernet cables, high-definition multimedia interface (HDMI) cables, other type of connections, or combinations thereof). The connections 118 may enable the media device 110 and the computer system 112 to reliably and securely transfer data to and from the CPE 104.

The system 100 may include or support communications with one or more resident wireless-enabled devices, such as a first resident wireless-enabled device 120 that communicates with the CPE 104 via a wireless connection 122 to the secured wireless local network 102 and a second resident wireless-enabled device 124 that may be coupled to the CPE 104 via the secured wireless local network 102. Each resident wireless-enabled device 120, 124 may be a fixture in a residence, such as a controller (e.g., a security system controller, a lighting system controller, or a controller for an air conditioning and heating system), an appliance (e.g., a printer, a computer, an oven, a washing machine, or a refrigerator), or both. The first resident wireless-enabled device 120 may utilize the wireless connection 122 to the secured wireless local network 102 to send warnings when thresholds are met, to enable control of one or more devices at the residence from locations remote from the residence or within the residence, to obtain software updates, to provide operational status to a device at a remote location or within the residence, to provide other services, or for combinations thereof. In the embodiment illustrated in FIG. 1, the second resident wireless-enabled device 124 is a "new" device (i.e., a device that is not authorized to access the secured wireless local network 102). Thus, no wireless connection 122 is shown between the second resident wireless-enabled device 124 and the secured wireless local network 102.

The system 100 may include or support communications with one or more portable wireless-enabled devices, such as a first portable wireless-enabled device 126 that communicates with the CPE 104 by a wireless connection 122 to the secured wireless local network 102 and a second portable wireless-enabled device 128 that may be coupled to the CPE 104 via the secured wireless local network 102. Each portable wireless-enabled device 126, 128 may be, but is not limited to, a mobile communication device, a tablet computer, a personal digital assistant, a laptop computer, another type of communication device, or combinations thereof. The first portable wireless-enabled device 126 may utilize the wireless connection 122 to the secured wireless local network 102 to receive data from the network 106 and to transmit data to the network 106. The first portable wireless-enabled device 126 may also utilize the wireless connection to the secured wireless local network 102 to receive commands, data, or both from one or more devices coupled to the secured wireless local network 102 and to transmit commands, data, or both to the one or more devices coupled to the secured wireless local network 102. For example, the first portable wireless-enabled device 126 may transmit a command via the secured wireless local network 102 to the media device 110 to obtain media content stored at the media device 110. In response to the command, the media device 110 may transmit the requested media content to the first portable wireless-enabled device 126 via the secured wireless local network 102. In the embodiment illustrated in FIG. 1, the second portable wireless-enabled device 128 is a "new" device (i.e., a device that is not authorized to access the secured wireless local network 102). Thus, no wireless connection 122 is shown between the second portable wireless-enabled device 128 and the secured wireless local network 102.

The system 100 may include a security device 130. The security device 130 may control access to the secured wireless local network 102. The security device 130 may control access to the secured wireless local network 102 for devices that are authorized to access the secured wireless local network 102 (i.e., devices that were previously granted access to the secured wireless local network 102) and for devices that are not authorized to access the secured wireless local network 102.

For a device that was previously granted access to the secured wireless local network 102, the security device 130 may check that a password provided by the device matches a network password for the secured wireless local network 102, that an identifier of the device (e.g., a media access control (MAC) address of the device) matches a device identifier in a white list 132 of the security device 130, or both before granting the device access to the secured wireless local network 102. The white list 132 may also include one or more access restrictions associated with each device identifier in the white list 132 that are enforced by the security device 130. The access restrictions may include, but are not limited to, a time limitation, a bandwidth limitation, a content filter limitation, an access duration limitation, an access logging limitation, a content type limitation for downloads, a content type limitation for uploads, a requirement to use encrypted communications, other limitations, or combinations thereof. When the password is correct and none of the access restrictions are violated, the security device 130 may enable the device to access the secured wireless local network 102. When the password is incorrect or when one or more of the access restrictions are violated by the device, the security device 130 may send an appropriate denial notification to the device and deny the device access to the secured wireless local network 102.

For a device that is not authorized to access the secured wireless local network 102 (e.g., the second resident wireless-enabled device 124 or the second portable wireless-enabled device 128), the security device 130 may facilitate a decision by an administrator of the secured wireless local network 102 whether to allow or deny the device access to the secured wireless local network 102. When the administrator authorizes the device to connect to the secured wireless local network 102, the device may be granted access to the secured wireless local network 102 without user input of a network password for the secured wireless local network 102. The security device 130 may also facilitate encryption of communications transmitted via the secured wireless local network 102. The security device 130 may implement a key sharing process by providing an encryption program, an encryption key to code unencrypted data and to decode encrypted data, or both to a device that has been granted access to the secured wireless local network 102.

In the embodiment depicted in FIG. 1, the security device 130 is the wireless access point device 108. In other embodiments, another device coupled to the secured wireless local network 102, such as the media device 110 or the computer system 112, may serve as the security device 130. The security device 130 may be integral with the CPE 104 or coupled to the CPE 104 by a wireless or a physical connection (e.g., by the connection 118). The device that is assigned to be the security device 130 may be determined during set-up of the secured wireless local network 102.

The security device 130 may include a processor 134 and a memory 136. The memory 136 may store data. The data may include a security module 138. The security module 138 may include instructions executable by the processor 134 to perform tasks related to enabling or denying access to the secured wireless local network 102. The data may also include the white list 132 of device identifiers of devices allowed to access the secured wireless local network 102, a black list 140 of device identifiers of devices that are not allowed to access the secured wireless local network 102, and settings 142. In some embodiments, the white list 132 and the black list 140 may be implemented as a single list.

The settings 142 may be accessed via a configuration page by an administrator of the secured wireless local network 102. A password may be required to access the configuration page. The configuration page may be accessed via the media device 110, via the computer system 112, or via another input device.

The configuration page may enable the administrator to select an operating mode of the security device 130 for processing access to the secured wireless local network 102 by devices that are not authorized to access the secured wireless local network 102. Available operation modes may include a first mode that is a passive mode and a second mode that is an active mode.

When the first mode is selected, the security module 138 may wait to receive identification information from a device that is not authorized to access the secured wireless local network 102 before the security module 138 sends an access request message to one or more messaging addresses specified in the settings 142. The first mode may be the normal or default operating mode for the security device 130. When the second mode is selected, the security module 138 may determine one or more devices that are able to access the secured wireless local network 102 but not authorized to access the secured wireless local network 102 and send identification information for the one or more devices to the one or more messaging addresses specified in the settings 142. The second mode may be used when a new device (e.g., the second resident wireless-enabled device 124) is installed to simplify granting access to the secured wireless local network 102 to the new device.

The configuration page may enable the administrator to specify one or more messaging addresses to send an access request message for a device seeking access to the secured wireless local network 102 that is not authorized to access the secured wireless local network 102. The configuration page may enable the administrator to specify a type of message to be sent to the one or more messaging addresses. The configuration page may also enable entry of an optional password for a particular messaging address needed by a recipient of the access request message to view the contents of the access request message. An access request message may be sent as a short-messaging service (SMS) message, an electronic mail (e-mail) message, an instant messaging message, another type of message, as data that a receiving device uses to generate a display screen pop-up message, or as combinations thereof. For example, the settings may specify a first messaging address that is an e-mail address associated with a first administrator and a second messaging address associated with the media device 110. The type of message associated with the first messaging address may be an e-mail message. When a particular access request message is sent to the first messaging address, a recipient may use the computer system 112, a mobile communication device 144, or another device to view and respond to the access request message. The type of message associated with the second messaging address may be data used by the receiving device to generate a display screen pop-up message. The second messaging address may be an address associated with the media device 110. When the media device 110 receives the data, a processor of the media device 110 may generate the display screen pop-up message and send the display screen pop-up message to the display device 114.

The optional password may be used when the access request message is to be sent to a device that may be accessed by many people. For example, the optional password may be required to view the access request message when the access request message is presented on the display device 114 coupled to the media device 110. As another example, the optional password may not be required when the access request message is an e-mail message sent to an e-mail address.

The configuration page may be used to change other settings for the security device 130. For example, the configuration page may be used to change the network password for the secured wireless local network 102, may be used to edit or reset the white list 132, and may be used to edit or reset the black list 140.

Figure 2:
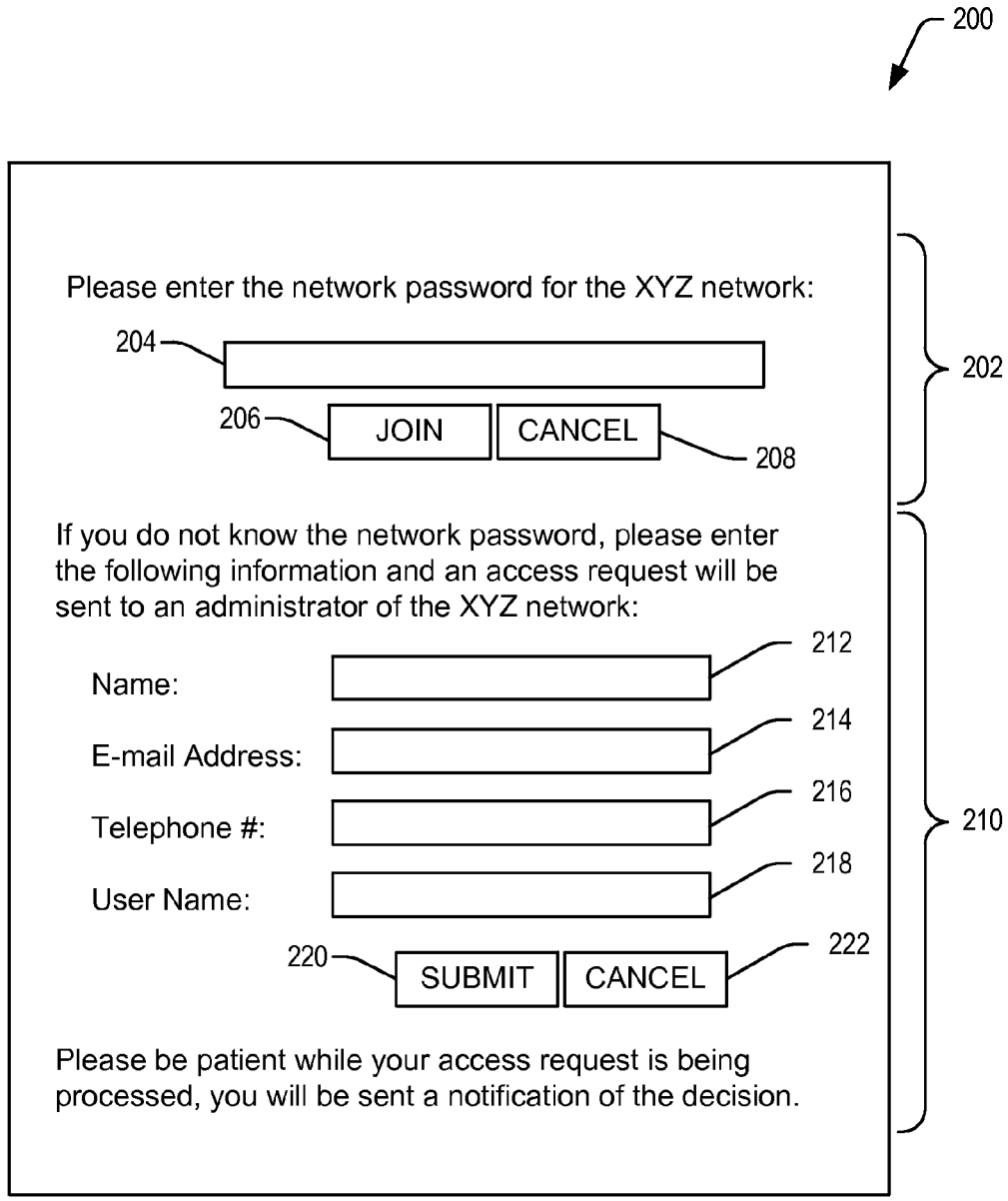
FIG. 2 is a representation of a particular embodiment of a portion of an access request interface that facilitates access to a secured wireless local network without user input of a network password.

During operation of the security device 130 when the security device 130 is in the first mode, a device that is not authorized to access the secured wireless local network 102 may attempt to access the secured wireless local network 102. For example, a user of the second portable wireless-enabled device 128 may attempt to access a mail server or a web page using the portable wireless-enabled device 128. In response to the attempt, the portable wireless-enabled device 128 may display a list of names of networks detected by the portable wireless-enabled device 128. The user may select the name of the secured wireless local network 102. When the name of the secured wireless local network 102 is selected, the portable wireless-enabled device 128 may initiate communications with the security device 130 of the secured wireless local network 102. The communications may result in the second portable wireless-enabled device 128 sending an access request interface to a display 146 of the second portable wireless-enabled device 128. FIG. 2 depicts an embodiment of an access request interface.

Figure 3:
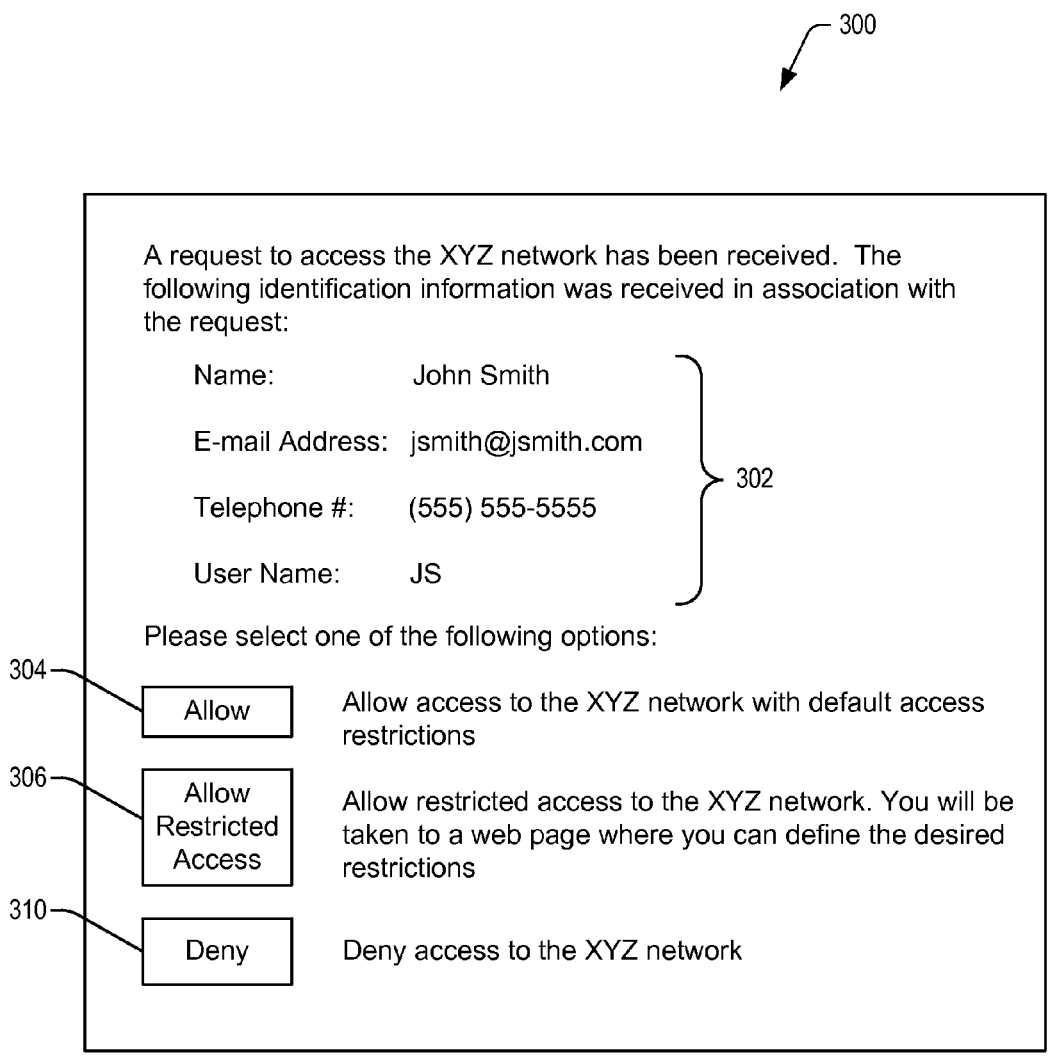
FIG. 3 is a representation of a particular embodiment of a portion of an access request message that facilitates access to a secured wireless local network without user input of a network password.

The access request interface may include fields for user input. The access request interface may include a field for a network password of the secured wireless local network 102. When the user of the second portable wireless-enabled device 128 knows the network password or when a person who knows the network password is present, the network password may be entered to gain access to the secured wireless local network 102 for the second portable wireless-enabled device 128. The access request interface may also include fields for requested information when the network password is not entered in the network password field. The requested information may include a name of a person seeking access to the secured wireless local network 102 and contact information (e.g., a telephone number, an e-mail address, a residence address, other information, or combinations thereof) of the person. When the user submits the requested information, the security device 130 may receive the requested information, and the security module 138 may cause the processor 134 to incorporate at least a portion of the requested information into an access request message. The security module 138 may cause the processor 134 to send the access request message to one or more messaging addresses specified in the settings 142. In some embodiments, the access request message may be encrypted before being sent to the one or more messaging addresses specified in the settings 142. The access request message may include all of or a portion of the requested information. The access request message may be sent via the network 106, the secured wireless local network 102, or both. For example, the messaging addresses specified in the settings 142 may cause the access request message to be sent as an e-mail to a particular e-mail address. A recipient may access the access request message at a device enabled to receive e-mail sent to the e-mail address. In another example, the access request message may be sent to the mobile communication device 144 via a mobile communication network 148. FIG. 3 depicts an embodiment of a portion of the access request message presented on a display (e.g., the display 150 of the mobile communication device 144.

The recipient of the access request message may be presented all of or a portion of the requested information along with one or more selectable options. A first selectable option may allow access to the secured wireless local network 102 to the portable wireless-enabled device 128 with default access restrictions defined in the settings 142. A second selectable option may allow access to the secured wireless local network 102 to the portable wireless-enabled device 128 subject to access restrictions specified by the recipient. A third selectable option may deny access to the secured wireless local network 102 to the portable wireless-enabled device 128. When the recipient selects the second option, a device used by the recipient to view the access request message may access a web page or other user interface where the recipient may specify desired access restrictions. When the recipient selects the third option, the recipient may be presented with an additional option to add an identifier of the portable wireless-enabled device 128 to the black list 140.

When the recipient selects a particular option or particular options, a response to the access request message may be received by the security device 130. The response may be encrypted before being sent to the security device 130. The security module 138 may determine a decision of whether to allow or deny access to the secured wireless local network 102 for the second portable wireless-enabled device 128 based on the response. The security module 138 may cause the processor 134 to send an appropriate notification of the decision regarding access to the secured wireless local network 102 to the second portable wireless-enabled device 128. When the decision is to allow access to the secured wireless local network 102, access is provided without receiving user input of the network password from the portable wireless-enabled device 128. In a particular embodiment, the access is provided to the portable wireless-enabled device 128 without user input of the network password by the recipient of the access request message. When the decision is to allow access to the secured wireless local network 102, the security device 130 may enable encrypted communications with the portable wireless-enabled device 128, may send the network password to the portable wireless-enabled device 128, may add an identifier of the portable wireless-enabled device 128 to the white list 132, may associate restrictions to be applied to the portable wireless-enabled device 128 with the white list entry for the portable wireless-enabled device 128, or combinations thereof. The security module 138 may deny access to the secured wireless local network 102 by the portable wireless-enabled device 128 when the decision is to deny access to the secured wireless local network 102. The security module 138 may also add the identifier of the portable wireless-enabled device 128 to the black list 140 when the option to add the identifier to the black list 140 was selected by the recipient of the access request message.

The portable wireless-enabled device 128 may receive the notification of the decision from the security device 130. The portable wireless-enabled device 128 may send information indicative of the result of the decision to the display 146.

During operation of the security device 130 when the security device 130 is in the second mode, the security module 138 may identify one or more devices that are not authorized to access the secured wireless local network 102. For example, the security module 138 may identify the second resident wireless-enabled device 124 as a device within a range of the secured wireless local network 102 that is not authorized to access the secured wireless local network 102. When the second resident wireless-enabled device 124 is identified, the security module 138 sends an access request message to one or more messaging addresses specified in the settings 142. The access request message may include an identifier of the second resident wireless-enabled device 124 (e.g., the MAC address of the resident wireless-enabled device 124).

The recipient of the access request message may be presented with one or more selectable options. A first selectable option may allow access to the secured wireless local network 102 to the second resident wireless-enabled device 124 with default access restrictions defined in the settings 142. A second selectable option may allow access to the secured wireless local network 102 to the second resident wireless-enabled device 124 subject to access restrictions specified by the recipient of the access request message. A third selectable option may deny access to the secured wireless local network 102 to the second resident wireless-enabled device 124. When the recipient selects the second option, a device used by the recipient to view the access request message may access a web page or other user interface where the recipient may specify the desired access restrictions. When the recipient selects the third option, the recipient may be presented with an additional option to add an identifier of the resident wireless-enabled device 124 to the black list 140.

When the recipient selects a particular option or particular options, a response to the access request message may be received by the security device 130. The response may include a decision regarding granting or denying access to the secured wireless local network 102 to the second resident wireless-enabled device 124. When the decision is to allow access to the secured wireless local network 102, access is provided without receiving user input of the network password from the resident wireless-enabled device 124. In a particular embodiment, the access is provided to the resident wireless-enabled device 124 without user input of the network password by the recipient of the access request message. When the decision is to allow access to the secured wireless local network 102, the security device 130 may enable encrypted communications with the resident wireless-enabled device 124, may send the network password to the resident wireless-enabled device 124, may add an identifier of the resident wireless-enabled device 124 to the white list 132, may associate restrictions to be applied to the resident wireless-enabled device 124 with the white list entry for the resident wireless-enabled device 124, or combinations thereof. The security module 138 may deny access to the secured wireless local network 102 by the resident wireless-enabled device 124 when the decision is to deny access. The security module 138 may also add the identifier of the resident wireless-enabled device 124 to the black list 140 when the option to add the identifier to the black list 140 was selected by the recipient of the access request message.

FIG. 2 is a representation of a particular embodiment of a portion of an access request interface 200 that facilitates access to a secured wireless local network without user input of a network password. The access request interface 200 may be sent to a display of a device that seeks access to a secured wireless local network (e.g., the display 146 of the second portable wireless-enabled device 128 when the second portable wireless-enabled device 128 seeks access to the secured wireless local network 102, as depicted in FIG. 1).

The access request interface 200 may include a first portion 202 that may be used when a network password for the network is known. The first portion 202 may include a text entry box 204 for the network password. When the network password is entered correctly in the text entry box 204, the network password may be submitted by selecting a join option 206. A user of the access request interface 200 may exit the access request interface 200 by selecting the cancel option 208.

The access request interface 200 may also include a second portion 210. The second portion 210 may be used when the network password is not known. The second portion 210 may include one or more fields, such as text boxes 212-218, for entry of requested information. The text boxes 212-218 may include a text box 212 for a name of a person requesting access to the secured wireless local network, a text box 214 for an e-mail address of the person, a text box 216 for a telephone number of the person, and a text box 218 for a user name of the person. In other embodiments, less information, more information, different information, or combinations thereof may be requested via the access request interface 200. When the requested information is entered, the requested information may be submitted by selection of a submit option 220. A user of the access request interface 200 may exit the access request interface 200 by selecting the cancel option 222.

FIG. 3 is a representation of a particular embodiment of a portion of a displayed access request user message 300 that facilitates access to a secured wireless local network without user input of a network password. The access request user message 300 may be sent to a display of a device associated with a messaging address where access request messages for the secured wireless local network are sent. For example, the access request message may be sent to the display 150 of the mobile communication device 144 depicted in FIG. 1 when the messaging address is associated with the mobile communication device 144. The displayed access request user message 300 may include information 302 provided by a user of a device seeking access to the secured wireless local network. The information 302 may include, for example, a name, an e-mail address, a telephone number, and a user name. In other embodiments, the information 302 may include less information, more information, different information, or combinations thereof.

The displayed access request user message 300 may include selectable options 304-306 for a recipient of the access request message. Selection of an allow selectable option 304 may enable the device associated with the access request message access to the secured wireless local network in accordance with default access restrictions for the secured wireless local network. Selection of an allow restricted access selectable option 306 may enable the device associated with the access request message access to the secured wireless local network in accordance with one or more restrictions to be specified by the recipient of the access request message. Selection of the allow restricted access selectable option 306 may cause the device used by the recipient to access a web page or other user interface where restrictions may be specified. The specified restrictions may enable greater access to the secured wireless local network than the access enabled by the default access restrictions, the same access to the secured wireless local network as the access enabled by the default access restrictions, or less access to the secured wireless local network than the access enabled by the default access restrictions. When the recipient of the access request message selects the allow selectable option 304 or the allow restricted access selectable option 306, access to the secured wireless local network by the device associated with the access request message may be enabled by a security device that receives a response to the access request message (e.g., the security device 130 of FIG. 1). Access to the secured wireless local network may be provided without the security device receiving user input of the network password for the secured wireless local network.

Selection of the deny selectable option 308 may deny the device associated with the access request message access to the secured wireless local network. Selection of the deny selectable option 308 may result in the presentation of an additional selectable option that enables the recipient of the access request message to place an identifier of the device associated with the access request message in a black list. Placing the identifier of the device in the black list may prevent subsequent access request messages from being sent by a security device of the secured wireless local network if the device associated with the access request message tries again to access the secured wireless local network.

Figure 4:
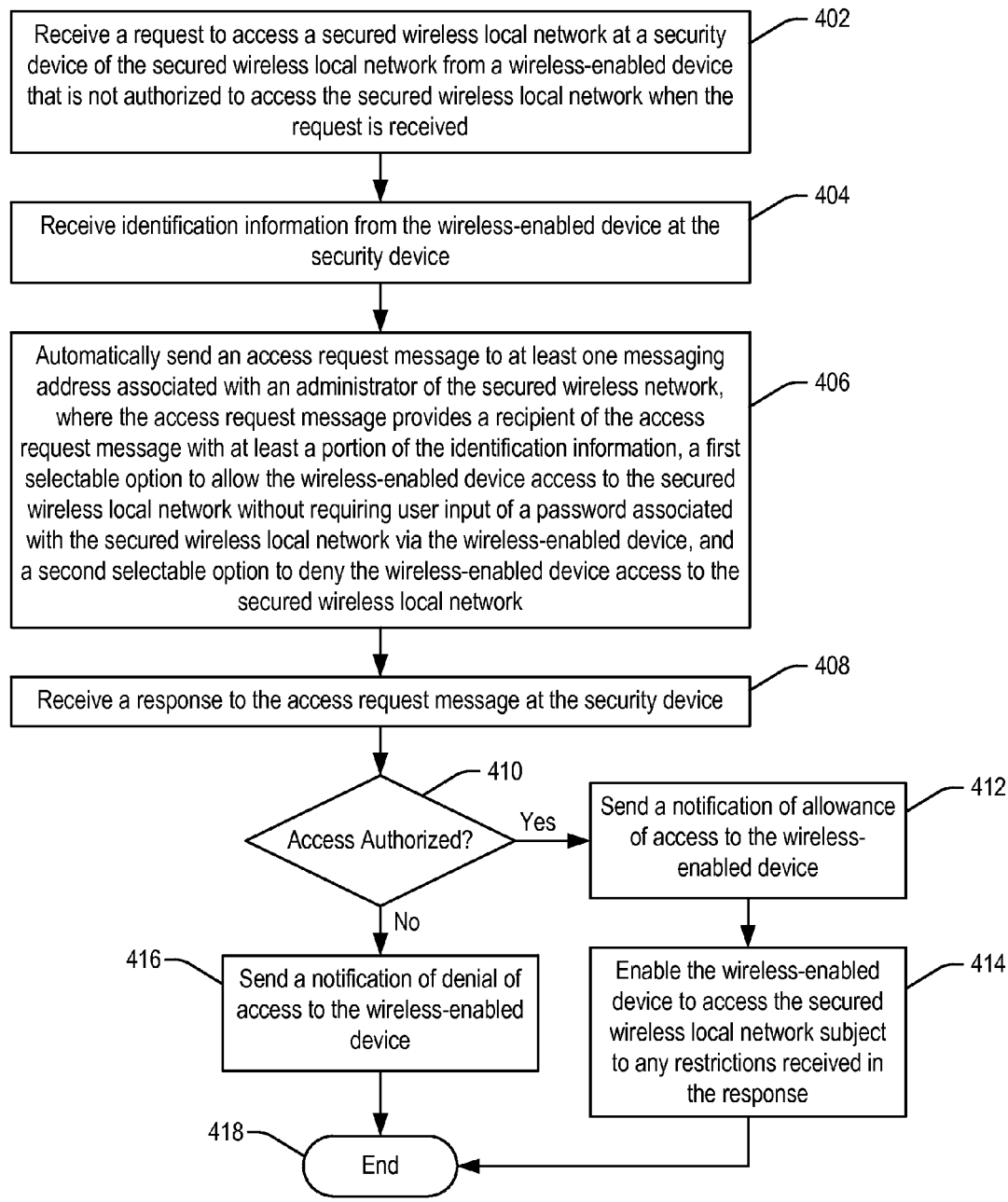
FIG. 4 is a flow chart of a first particular embodiment of a method to enable access to a secured wireless local network without user input of a network password.

Referring to FIG. 4, a flow chart of a first particular embodiment of a method to enable access to a secured wireless local network without user input of a network password is shown. The method may be performed, for example, by a security device of a secured wireless local network (e.g., by the security device 130 of the secured wireless local network 102 depicted in FIG. 1).

At 402, a request to access the secured wireless local network may be received at the security device of the secured wireless local network from a wireless-enabled device that is not authorized to access the secured wireless local network when the request is received. The security device may be, but is not limited to, a wireless access point device, a media device, a computer system, or another component of the secured wireless local network that limits access to the secured wireless local network. The request may be received in response to a user of the wireless-enabled device selecting an identifier (e.g., a name, service set identifier, or other identifier) of the secured wireless local network from a list of available wireless local networks. The list of available wireless local networks may be provided by the wireless-enabled device in response to the wireless-enabled device executing a program or an application (e.g., a browser or an e-mail application), or in response to the user of the wireless-enabled device accessing a selection of available wireless networks.

In an embodiment, the wireless-enabled device displays an access request interface associated with the secured wireless local network at a display device of the wireless-enabled device in response to input selecting the secured wireless local network. For example, the wireless-enabled device may receive the address of a guest page that includes the access request interface from the security device. Then, the access request interface may be sent to the display device when the guest page is accessed by the wireless-enabled device. In another embodiment, the security device may send the access request interface to the wireless-enabled device in response to detecting the wireless-enabled device within range of the secured wireless local network or in response to an attempt to access the secured wireless local network. In another embodiment, the wireless-enabled device may generate the access request interface after the wireless-enabled device determines that the secured wireless local network is enabled to send an access request message. The determination may be made based on a response to an access request query sent by the wireless-enabled device to the security device.

When the secured wireless local network is not enabled to send the access request message, the access request interface may include an entry for a network password of the secured wireless local network. When the secured wireless local network is enabled to send the access request message, the access request interface may include a first portion and a second portion. The first portion may allow a user of the wireless-enabled device to enter the network password for the secured wireless local network. The second portion may allow the user to provide information that may be used by an administrator of the secured wireless local network to determine whether to allow or deny the wireless-enabled device access to the secured wireless local network. The information may include, but is not limited to, identification information and suggested access restrictions. The identification information may include a name of the user, a username for the user, an e-mail address of the user, a phone number of the user, other information associated with the user, and combinations thereof. The suggested access restrictions may include a length of time until the user no longer needs access to the secured wireless local network (e.g., 1 day, 1 week, or open ended).

The access request interface may receive the information via user input (e.g., from a keyboard, touch screen, remote control device, other input device, or combinations thereof), via retrieval from a memory of the wireless-enabled device, or both. The information and an identifier of the wireless-enabled device (e.g., a media access control (MAC) address) may be sent to the security device of the secured wireless local network. All or a portion of the information, including all or a portion of the identification information, may be received by the security device, at 404.

An access request message may be automatically sent from the security device to at least one messaging address associated with an administrator of the secured wireless local network, at 406. The access request message may provide a recipient of the access request message (e.g., an administrator of the secured wireless local network) with at least a portion of the identification information. The recipient may determine whether to allow or deny access to the secured wireless local network for the wireless-enabled device based on recognition of one or more identifiers of the user included in the identification information. The access request message may include suggested access restrictions provided by the user. The access request message may provide the recipient with a selectable option to allow the wireless-enabled device access to the secured wireless local network without requiring user input of a network password associated with the secured wireless local network via the wireless-enabled device. The access request message may also provide the recipient with a second selectable option to deny the wireless-enabled device access to the secured wireless local network. When the recipient chooses the second selectable option, the recipient may be presented with an additional selectable option to place an identifier of the wireless-enabled device in a black list. Placing the identifier of the wireless-enabled device in the black list may inhibit the security device from sending further access request messages associated with the wireless-enabled device to the at least one messaging address associated with the administrator of the secured wireless local network upon subsequent attempts to access the secured wireless local network by the wireless-enabled device.

The access request message may include a third option that allows the recipient to set access restriction settings associated with the secured wireless local network for the wireless-enabled device. Granting access to the secured wireless local network for the wireless-enabled device using the first selectable option may result in the application of general or default access restrictions established in settings of the security device to the wireless-enabled device. For example, the general access restrictions may allow a new device that is granted access to the secured wireless local network to have a limited session length (e.g., an access duration of one hour) and have access to the secured wireless local network for a month before requiring the new device to submit another access request. The third option allows the recipient to tailor access restrictions for the wireless-enabled device seeking access to the secured wireless local network without changing the general or default access restrictions. For example, the wireless-enabled device may be a newly purchased tablet computer for an owner of the secured wireless local network. The recipient may change the general access duration limitation to unlimited and the time limitation to an open ended time limitation so that the wireless-enabled device will not be subjected to the general session limitation of one hour and so that the recipient will not receive further access requests associated with the wireless-enabled device. The access restriction settings that are changeable via the third option may include, but are not limited to, a time limitation, a bandwidth limitation, a content filter limitation, an access duration limitation, an access logging limitation, a content type limitation for downloads, a content type limitation for uploads, usage of encryption, or combinations thereof. The access restrictions for the wireless-enabled device may be changed without requiring user entry of the network password by the recipient. The security device is configured to store and implement restrictions received in responses to access request messages for devices granted access to the secured wireless local network.

A response to the access request message may be received at the security device, at 408. The security device may determine whether access to the secured wireless local network is authorized, at 410. When access is authorized, a notification of allowance of access to the secured wireless local network may be sent to the wireless-enabled device, at 412. Access may be provided without receipt of user input of the network password for the secured wireless local network and without user input of the network password for the secured wireless local network by an administrator of the secured wireless local network. The wireless-enabled device may be enabled to access the secured wireless local network subject to applicable restrictions (e.g., general or default access restrictions or selected access restrictions received in the response), at 414. The method may end, at 418.

When access to the secured wireless local network is not authorized, at 410, a notification of denial of access may be sent to the wireless-enabled device, at 416. The security device may inhibit access to the secured wireless local network by the wireless-enabled device. The method may end, at 418.

In some embodiments, the security device may initiate a timer when the access request message is sent. When the security device does not receive a response to the access request message within a predetermined time (e.g., 3 minutes, 5 minutes, 30 minutes, an hour, or some other time period), the security device may send a non-response message to the wireless-enabled device that notifies the user of the wireless-enabled device that an administrator has not responded to the access request. The non-response message may include a selectable option to send an additional access request message. When a predetermined number of additional access request messages (e.g., one, two, three, or more) have been sent without receiving a response to the additional access request messages, an unavailability notice may be sent to the wireless-enabled device. The unavailability notice may inform the user of the wireless-enabled device that an administrator is not available to authorize the access request and that the user should try again at another time.

Figure 5:
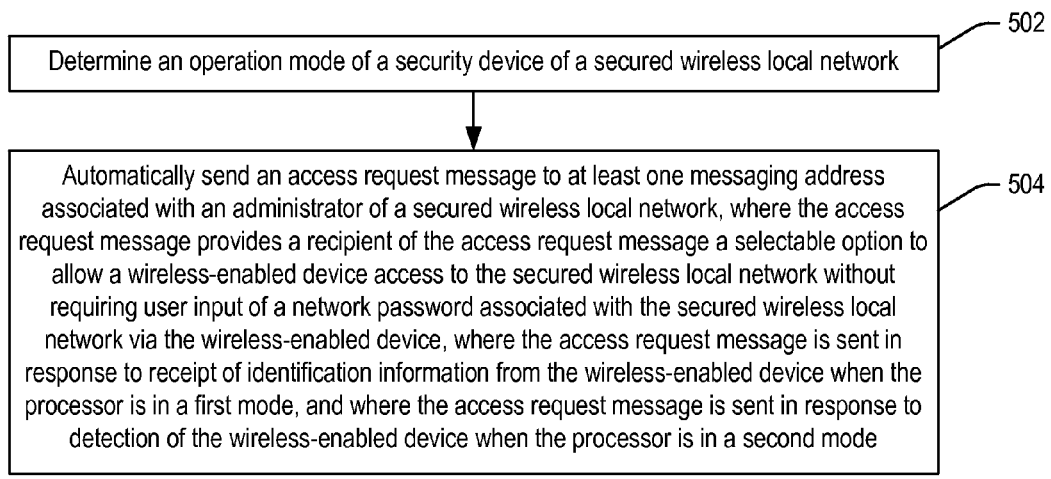
FIG. 5 is a flow chart of a second particular embodiment of a method to enable access to a secured wireless local network without user input of a network password.

Referring to FIG. 5, a flow chart of a second particular embodiment of a method to enable access to a secured wireless local network without user input of a network password is shown. The method may be performed, for example, by a security device of a secured wireless local network (e.g., by the security device 130 of the secured wireless local network 102 depicted in FIG. 1).

At 502, an operational mode of a security device of a secured wireless local network may be determined by a processor of the security device. The security device may wait for an access request when operating in a first mode. The first mode may be a normal or default mode of operation. The first mode may be used to provide access to the secured wireless local network to wireless-enabled devices that request access without requiring user entry of the network password from the wireless-enabled devices. A second mode may allow the security device to identify wireless-enabled devices that are able to connect to the secured wireless local network but are not presently authorized to access the secured wireless local network. The second mode may be used to enable a newly installed device (e.g., home security devices, home appliances, or other device) access to the secured wireless local network without receiving an access request from the newly installed device. The operational mode of the security device may be set by an administrator of the secured wireless local network by accessing settings for the security device.

An access request message may be automatically sent from the security device to at least one messaging address associated with an administrator of the secured wireless local network, at 504. The access request message may provide a recipient of the access request message a selectable option to allow a wireless-enabled device access to the secured wireless local network without requiring user input of a network password associated with the secured wireless local network via the wireless-enabled device. Also, user entry of the network password by the recipient of the access request message or an administrator of the secured wireless local network may not be required to enable the wireless-enabled device access to the secured wireless local network. The access request message may be sent in response to receipt of identification information from the wireless-enabled device when the processor is in the first mode. The access request message is sent in response to detection of the wireless-enabled device when the processor is in the second mode. The access request message may include identification information obtained from the wireless-enabled device (e.g., a MAC address of the wireless-enabled device or other identifiers, requested identification information associated with a user of the wireless-enabled device, or combinations thereof). The access request message may also provide a recipient with a second selectable option to deny the wireless-enabled device access to the secured wireless local network.

Figure 6:
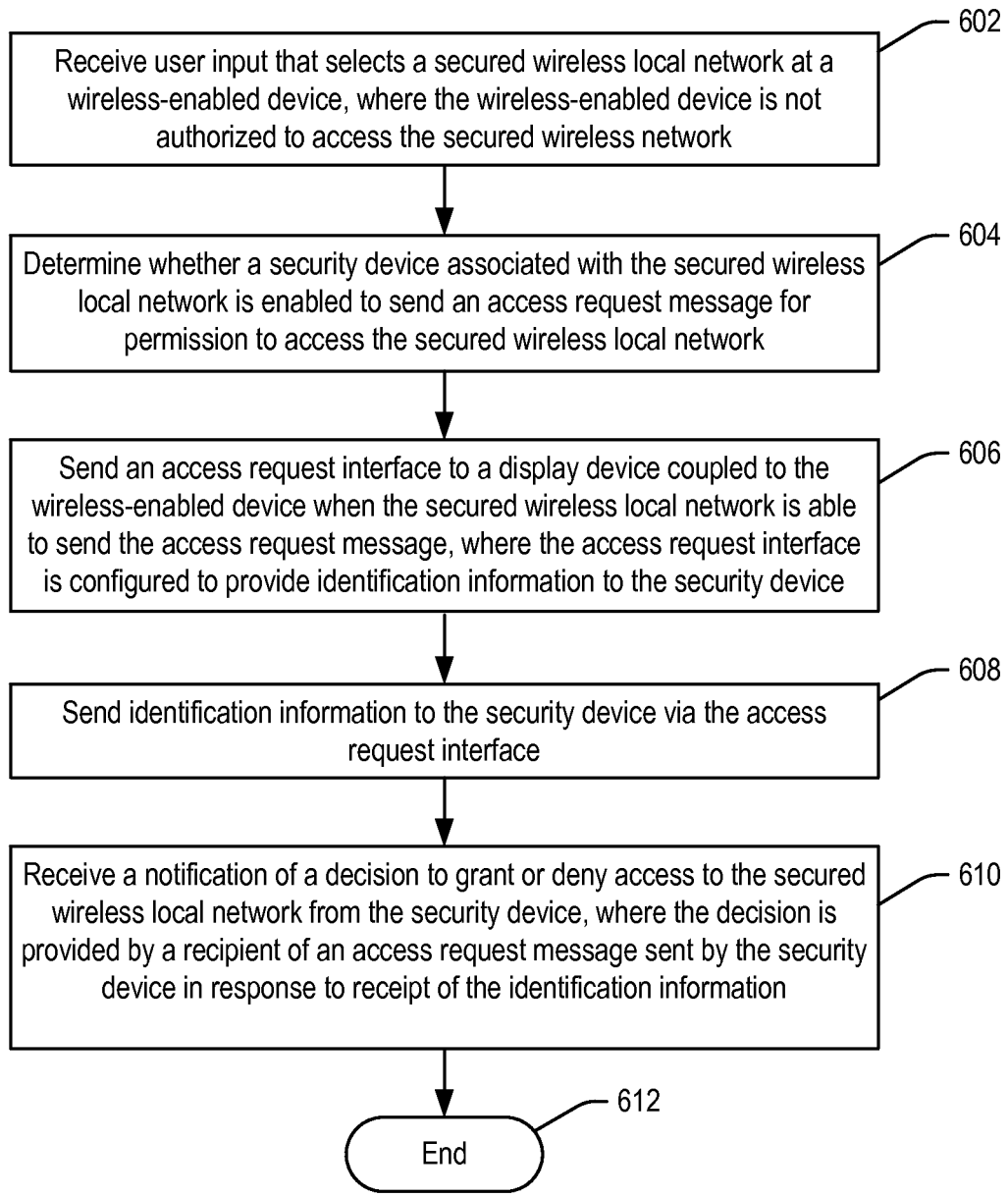
FIG. 6 is a flow chart of a third particular embodiment of a method to enable access to a secured wireless local network without user input of a network password.

Referring to FIG. 6, a flow chart of a third particular embodiment of a method to enable access to a secured wireless local network without user input of a network password is shown. The method may be performed, for example, by the portable wireless-enabled device 128 of FIG. 1.

At 602, user input that selects a secured wireless local network may be received at a wireless-enabled device, where the wireless-enabled device is not authorized to access the secured wireless local network. In response to the user input, the wireless-enabled device may determine whether a security device associated with the secured wireless local network is enabled to send an access request message for permission to access the secured wireless local network, at 604. The determination may be based on a response to an access request query sent by the wireless-enabled device to the secured wireless local network, based on data received from the secured wireless local network, based on stored information from previous attempts to access the secured wireless local network, or based on combinations thereof.

An access request interface may be sent to a display device coupled to the wireless-enabled device when the secured wireless local network is able to send the access request message, at 606. The access request interface may enable a user of the wireless-enabled device to provide identification information. Identification information may be sent to the security device via the access request interface, at 608. A notification of a decision to grant or deny access to the secured wireless local network may be received by the wireless-enabled device from the security device, at 610. The decision may be provided by a recipient of an access request message sent by the security device to at least one messaging address associated with an administrator of the secured wireless local network in response to receipt of the identification information. When the decision grants access to the secured wireless local network, access is granted without the need for user input of the network password for the secured wireless local network by an administrator of the secured wireless local network or by a user of the wireless-enabled device. The method may end at 612.

Various embodiments disclosed herein enable a wireless-enabled device that is not authorized to access a secured wireless local network to access the secured wireless local network without user entry of a network password via the wireless-enabled device. Enabling the wireless-enabled device to access the secured wireless local network without user entry of the network password may allow an administrator to decide whether to enable the wireless-enabled device to access the secured wireless local network without the need for the administrator or the user of the wireless-enabled device to provide the network password. Also, presence of the administrator at or near the secured wireless local network, or contact of the administrator by a person seeking access to the secured wireless local network, is not needed since an access request message may be sent to messaging addresses associated with the administrator.

Figure 7:
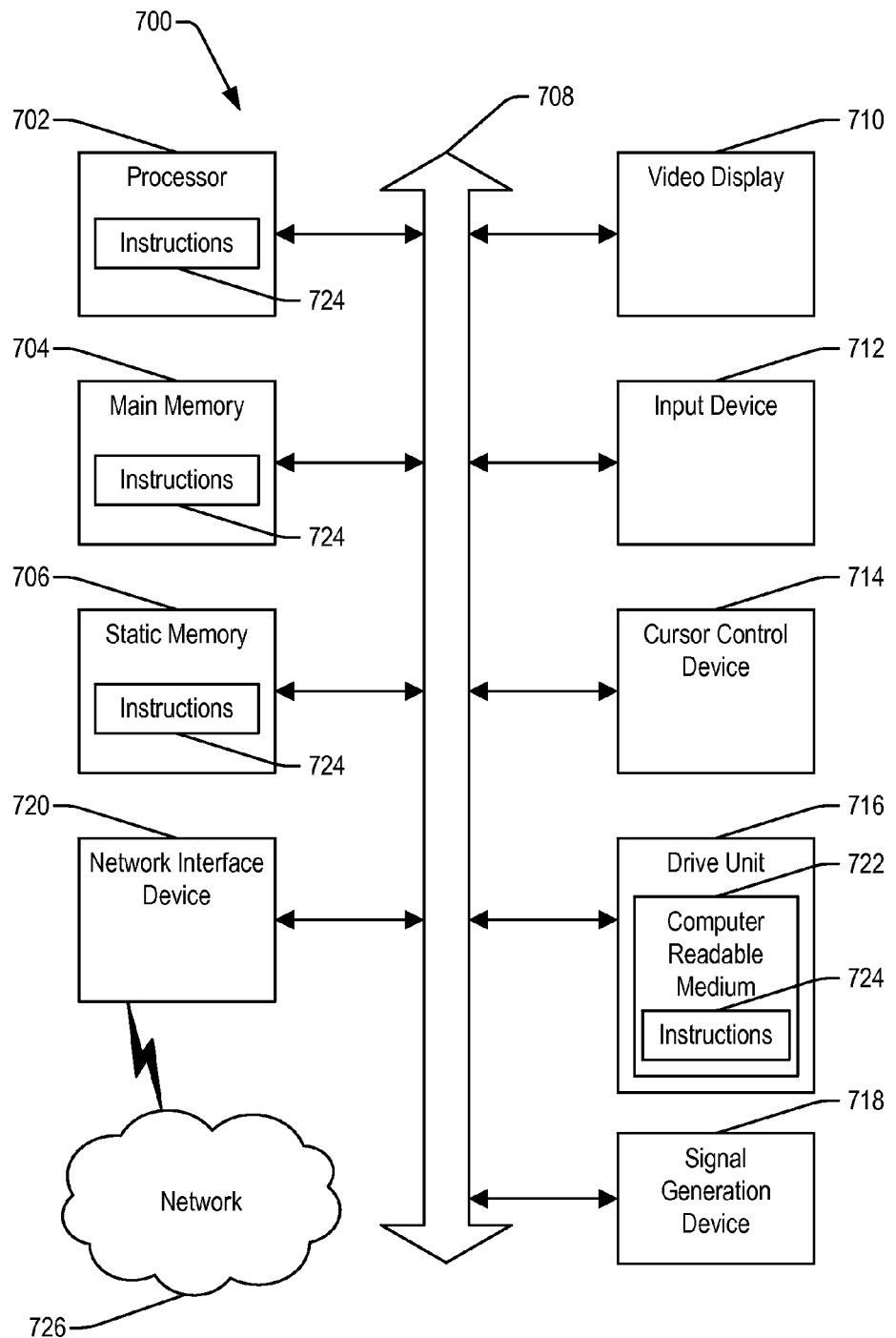
FIG. 7 is a block diagram of an illustrative embodiment of a general computer system.

Referring to FIG. 7, an illustrative embodiment of a general computer system is shown and is designated 700. The computer system 700 may include a set of instructions that can be executed to cause the computer system 700 to perform any one or more of the methods or computer based functions disclosed herein. The computer system 700 may operate as a standalone device or may be connected, e.g., using a network, to other computer systems or peripheral devices. For example, the computer system 700 may include or be included within any one or more of the CPE 104, the media device 110, the computer system 112, the residential wireless-enabled devices 120 and 124, the portable wireless-enabled devices 126 and 128, and the mobile communication device 144 described with reference to FIG. 1.

In a networked deployment, the computer system 700 may operate in the capacity of a server or as a client user computer in a server-client user network environment, or as a peer computer system in a peer-to-peer (or distributed) network environment. The computer system 700 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a web appliance, or any other machine capable of executing a set of instructions (sequential or otherwise) that specify actions to be taken by that machine. In a particular embodiment, the computer system 700 may be implemented using electronic devices that provide video, audio, or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 may include a main memory 704 and a static memory 706, which can communicate with each other via a bus 708. As shown, the computer system 700 may further include a video display unit 710, such as a liquid crystal display (LCD), a flat panel display, a solid state display, or a lamp assembly of a projection system. Additionally, the computer system 700 may include an input device 712, such as a keyboard or a touchscreen, and a cursor control device 714, such as a mouse. The computer system 700 may also include a drive unit 716, a signal generation device 718, such as a speaker or remote control, and a network interface device 720. Some computer systems 700 may not include an input device (e.g., a server may not include an input device).

In a particular embodiment, as depicted in FIG. 7, the drive unit 716 may include a computer-readable non-transitory storage medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable non-transitory storage media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure includes a computer-readable storage medium 722 that stores instructions 724 or receives, stores, and executes instructions 724, so that a device connected to a network 726 may communicate voice, video or data over the network 726. While the computer-readable storage medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable storage medium may include a solid-state memory such as a memory card or other package that houses one or more non-volatile read-only memories. Further, the computer-readable storage medium may be a random access memory or other volatile re-writable memory. Additionally, the computer-readable storage medium may include a magneto-optical or optical medium, such as a disk or tapes or other storage device. Accordingly, the disclosure is considered to include any one or more of a computer-readable storage medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, IEEE 802.x) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
  identifying, at a security device of a secured wireless network, a wireless-enabled device that is not authorized to access the secured wireless network;
  receiving, at the security device from the wireless-enabled device, user input of identification information for a user of the wireless-enabled device, wherein the user input does not include a network password for the secured wireless network;
  sending, from the security device, an access request message directed to a messaging address in response to the user input, wherein the access request message includes the identification information, includes a first selectable option to allow the wireless-enabled device access to the secured wireless network without requiring user input of the network password via the wireless-enabled device, and includes a second selectable option to deny the wireless-enabled device access to the secured wireless network;
  receiving a response to the access request message at the security device; and
  responsive to the response indicating selection of the first option, send an encryption key from the security device to the wireless-enabled device to enable the wireless-enabled device to communicate encrypted communications via the secured wireless network.

2. The method of claim 1, further comprising:
  receiving a request to access a configuration page of the security device;
  providing access to the configuration page; and
  receiving a selection of an active mode via the configuration page, wherein the active mode enables the security device to identify the wireless-enabled device.

3. The method of claim 1, further comprising:
  receiving a request to access a configuration page of the security device;
  providing access to the configuration page; and
  receiving a selection of an access restriction via the configuration page.

4. The method of claim 1, further comprising:
  receiving a request to access a configuration page of the security device;
  providing access to the configuration page; and
  receiving input to change the network password via the configuration page.

5. The method of claim 1, further comprising:
  receiving a request to access a configuration page of the security device;
  providing access to the configuration page; and
  receiving a selection to require entry of a password by a recipient of the access request message to view content of the access request message.

6. The method of claim 1, further comprising, responsive to the response indicating selection of the first selectable option, adding data that identifies the wireless-enabled device to a list of devices that are allowed access to the secured wireless network.

7. The method of claim 1, wherein the second selectable option includes a sub-option that allows selection of a third selectable option to add the wireless-enabled device to a black list.

8. The method of claim 1, wherein the access request message includes a third selectable option to enable restricted access to the secured wireless network.

9. The method of claim 8, further comprising, responsive to the response indicating selection of the third selectable option:
  adding first data that identifies the wireless-enabled device to a list of devices that are allowed access to the secured wireless network; and
  adding second data that indicates an access restriction for the wireless-enabled device to the list.

10. The method of claim 9, wherein the access restriction includes a time limitation, a bandwidth limitation, a content filter limitation, an access duration limitation, an access logging limitation, a content type limitation for downloads, or a content type limitation for uploads.

11. A system comprising:
  a processor configured to control access to a secured wireless network;
  a memory coupled to the processor, the memory comprising instructions executable by the processor to:
    identify a wireless-enabled device that is not authorized to access the secured wireless network;
    receive, from the wireless-enabled device, user input of identification information for a user of the wireless-enabled device, wherein the user input does not include a network password for the secured wireless network;
    send an access request message directed to a messaging address in response to the user input, wherein the access request message includes the identification information, includes a first selectable option to allow the wireless-enabled device access to the secured wireless network without requiring user input of the network password via the wireless-enabled device, and includes a second selectable option to deny the wireless-enabled device access to the secured wireless network;

receive a response to the access request message; and responsive to the response indicating selection of the first option, send an encryption key to the wireless-enabled device to enable the wireless-enabled device to communicate encrypted communications via the secured wireless network.

12. The system of claim 11, wherein the access request message is a password protected message that requires entry of a password by a recipient to enable display of the identification information, the first selectable option, and the second selectable option.

13. The system of claim 11, wherein the messaging address is associated with an administrator of the secured wireless network.

14. The system of claim 11, further comprising a display device coupled to the processor.

15. The system of claim 11, wherein the wireless-enabled device comprises a security system controller, a lighting system controller, an air conditioning system controller, a heating system controller, a printer, a computer, an appliance, or combinations thereof.

16. A computer-readable storage device comprising instructions, that when executed by a processor configured to control access to a secured wireless network, cause the processor to perform operations including:

identifying a wireless-enabled device that is not authorized to access the secured wireless network;

receiving, from the wireless-enabled device, user input of identification information for a user of the wireless-enabled device, wherein the user input does not include a network password for the secured wireless network;

sending an access request message directed to a messaging address in response to the user input, wherein the access request message includes the identification information, includes a first selectable option to allow the wireless-enabled device access to the secured wireless network without requiring user input of the network password via the wireless-enabled device, and includes a second selectable option to deny the wireless-enabled device access to the secured wireless network;

receiving a response to the access request message; and responsive to the response indicating selection of the first option, sending an encryption key to the wireless-enabled device to enable the wireless-enabled device to communicate encrypted communications via the secured wireless network.

17. The computer-readable storage device of claim 16, wherein the access request message is a password protected message that requires entry of a password by a recipient to enable display of the identification information, the first selectable option, and the second selectable option.

18. The computer-readable storage device of claim 16, wherein the computer-readable storage device is incorporated in a set-top box device.

19. The computer-readable storage device of claim 16, wherein the messaging address is associated with an administrator of the secured wireless network.

20. The computer-readable storage device of claim 16, wherein the access request message is sent as a short messaging service message, an electronic mail message, an instant messaging message, a display screen pop-up message, or a combination thereof.

* * * * *